(12) United States Patent
Singh et al.

(10) Patent No.: US 11,250,482 B2
(45) Date of Patent: Feb. 15, 2022

(54) SYSTEM AND METHOD FOR GENERATING AND DISPLAYING RATINGS FOR POINTS OF INTEREST

(71) Applicant: Visa International Service Association, San Francisco, CA (US)

(72) Inventors: Veni Singh, San Mateo, CA (US); Jagdeep Sahota, Mountain House, CA (US)

(73) Assignee: Visa International Service Association, San Francisco, CA (US)

( * ) Notice: Subject to any disclaimer, the term of this patent is extended or adjusted under 35 U.S.C. 154(b) by 130 days.

(21) Appl. No.: 16/491,332

(22) PCT Filed: Mar. 8, 2018

(86) PCT No.: PCT/US2018/021485
§ 371 (c)(1),
(2) Date: Sep. 5, 2019

(87) PCT Pub. No.: WO2018/165389
PCT Pub. Date: Sep. 13, 2018

(65) Prior Publication Data
US 2020/0020001 A1 Jan. 16, 2020

Related U.S. Application Data

(60) Provisional application No. 62/468,756, filed on Mar. 8, 2017.

(51) Int. Cl.
*G06Q 30/02* (2012.01)
*G06Q 30/06* (2012.01)

(52) U.S. Cl.
CPC ..... *G06Q 30/0282* (2013.01); *G06Q 30/0205* (2013.01); *G06Q 30/0631* (2013.01)

(58) Field of Classification Search
CPC ....................................................... G06Q 30/02
See application file for complete search history.

(56) References Cited

U.S. PATENT DOCUMENTS

| | | | | |
|---|---|---|---|---|
| 8,589,069 B1 * | 11/2013 | Lehman | ................ | H04W 4/029 701/438 |
| 8,983,973 B2 * | 3/2015 | Hill | .................. | G06F 16/24578 707/748 |
| 9,846,887 B1 * | 12/2017 | Cranshaw | .......... | G06Q 30/0205 |
| 2007/0032942 A1 * | 2/2007 | Thota | ..................... | G06Q 50/00 701/426 |

(Continued)

*Primary Examiner* — Kurtis Gills
(74) *Attorney, Agent, or Firm* — The Webb Law Firm

(57) ABSTRACT

Described are systems and methods for generating and displaying ratings for points of interest in a region. A method for generating ratings includes receiving transaction data from a plurality of points of interest, the transaction data representing financial transactions between a plurality of individuals and each point of interest of the plurality of points of interest. A method also includes automatically generating, for each point of interest of the plurality of points of interest, at least one point of interest rating based at least partially on the transaction data for the point of interest. A method further includes, in response to a selection of a chosen point of interest of the plurality of points of interest, providing to at least one user the at least one point of interest rating associated with the chosen point of interest.

16 Claims, 4 Drawing Sheets

(56) References Cited

U.S. PATENT DOCUMENTS

| | | |
|---|---|---|
| 2012/0303425 A1 | 11/2012 | Katzin et al. |
| 2013/0262479 A1* | 10/2013 | Liang .................... H04W 4/021 |
| | | 707/748 |
| 2015/0032543 A1 | 1/2015 | Weis et al. |
| 2016/0019613 A1 | 1/2016 | Roof et al. |
| 2016/0253737 A1 | 9/2016 | Chang et al. |

* cited by examiner

SYSTEM AND METHOD FOR GENERATING AND DISPLAYING RATINGS FOR POINTS OF INTEREST

CROSS REFERENCE TO RELATED APPLICATIONS

This application is THE United States national phase of International Application No. PCT/US 2018/021485 filed Mar. 8, 2019, and claims priority to U.S. Provisional Application Ser. No. 62/468,756, filed on Mar. 8, 2017, entitled "System and Method for Generating and Displaying Ratings for Points of Interest," the entire contents of which are hereby incorporated by reference in their entirety.

BACKGROUND

Disclosed embodiments or aspects relate generally to generating ratings for points of interest from transactional data and to methods and systems for generating and displaying the generated point of interest ratings to one or more users.

Technical Considerations

When searching for a point of interest, e.g., a restaurant, a store, etc., many users turn to crowd-sourced rating services, such as those provided by rating aggregators, e.g., Yelp, Google, and Trip Advisor. These rating aggregators operate largely on collecting voluntary contributions by other users, who ideally have experienced the point of interest for themselves. Services such as Yelp or Trip Advisor leverage this voluntary feedback from users to produce a crowd-sourced rating for a given point of interest. This calculated rating may not always be accurate. For example, users may not have personally experienced the point of interest, may rate the point of interest dishonestly or with exaggeration, or may provide multiple ratings under different submissions or user accounts. Moreover, many users who submit reviews of points of interest feel compelled to do so under extreme conditions, such as after experiencing severe disappointment or a surprisingly positive interaction. Therefore, existing point of interest ratings are often biased or inaccurate and require manual input from users.

Furthermore, crowd-sourced ratings often cannot capture more nuanced metrics of the point of interest, such as average cost, surges in crowds, price changes by time of day, popularity, whether the point of interest is frequented by locals or tourists, and the like. Some advanced service providers, such as Google, provide an estimated time spent at a point of interest, which is approximated by using geolocation services of mobile devices. However, because many interactions with points of interest occur without location-enabled mobile devices, the more nuanced metrics for points of interest are unavailable.

Finally, even if such detailed information about points of interest were available, users are unable to efficiently navigate the data with regard to their current location and the region. The user experience would be greatly improved by a more immersive means of viewing points of interest and their automated ratings. Current display systems lack the needed level of interactivity.

Therefore, there is a need in the art for a more automated, accurate, and detailed computation of ratings of points of interest, and further for an improved and more immersive and/or interactive manner of displaying the ratings to users.

SUMMARY

Accordingly, and generally, provided is an improved method and system for generating and displaying ratings for points of interest in a region. Preferably, provided is a system and method to use transaction data to automatically generate ratings and/or indications for points of interest. Preferably, provided is a system and method to display the ratings and/or indications associated with the points of interest in an augmented or virtual reality environment, which may be generated by a mobile device.

According to some non-limiting embodiments or aspects, provided is a computer-implemented method for generating ratings for points of interest in a region. The method includes receiving transaction data from a plurality of points of interest. The transaction data represents financial transactions between a plurality of individuals and each point of interest of the plurality of points of interest and includes at least one of the following: transaction count, transaction amount, transaction time, locality of the plurality of individuals, or any combination thereof. The method also includes automatically generating, for each point of interest of the plurality of points of interest, at least one POI rating based at least partially on the transaction data for the point of interest. The at least one POI rating includes: a popularity rating based at least partially on a frequency of financial transactions at the point of interest; a locality rating based at least partially on the locality of the plurality of individuals associated with the financial transactions at the point of interest; a crowd density rating based at least partially on a correlation between a frequency and the transaction time of financial transactions at the point of interest; a cost rating based at least partially on the transaction amount associated with each financial transaction at the point of interest; or any combination thereof. The method further includes, in response to a selection of a chosen point of interest of the plurality of points of interest, providing to at least one user the at least one POI rating associated with the chosen point of interest.

In some non-limiting embodiments or aspects, the computer-implemented method may include updating in real time the at least one POI rating for each point of interest of the plurality of points of interest when a new financial transaction occurs at the point of interest. The transaction data may include at least a transaction amount, a transaction time, and a locality of the plurality of individuals. The at least one POI rating may include the locality rating and may also include the crowd density rating. The at least one POI rating may further include the popularity rating and the cost rating. The crowd density rating may be determined relative to the transaction capacity of the point of interest.

In some embodiments or aspects, the computer-implemented method may include generating display data configured to generate on a display device a representation of at least one point of interest of the plurality of points of interest, the display data further configured to provide a visual representation of the at least one POI rating in association with the at least one point of interest. The method may also include obtaining at least one third-party rating associated with the chosen point of interest. The method may further include, in response to the selection of the chosen point of interest of the plurality of points of interest, providing to the at least one user the at least one third-party rating along with the at least one POI rating associated with the chosen point of interest for comparison by the at least one user.

In some non-limiting embodiments or aspects, the computer-implemented method may include automatically generating a confidence score of the at least one third-party rating based at least partially on a comparison to the at least one POI rating associated with the chosen point of interest. The method may also include, in response to the selection of the chosen point of interest of the plurality of points of interest, providing the confidence score to the at least one user. The method may include automatically generating at least one combined rating based at least partially on a combination of the at least one third-party rating and the at least one POI rating. The method may also include, in response to the selection of the chosen point of interest of the plurality of points of interest, providing the at least one combined rating to the at least one user. Additionally, the method may include automatically generating at least one recommended point of interest of the plurality of points of interest based at least partially on the at least one POI rating associated with the at least one recommended point of interest and at least one of the following data: personal information of the at least one user, a preference of the at least one user, a location of the at least one user, or any combination thereof. The method may further include providing to the at least one user the at least one recommended point of interest.

According to some non-limiting embodiments or aspects, provided is a system for generating ratings for points of interest in a region. The system includes a database including transaction data from a plurality of points of interest. The transaction data represents financial transactions between a plurality of individuals and each point of interest of the plurality of points of interest. The transaction data includes at least one of the following: transaction count, transaction amount, transaction time, locality of the plurality of individuals, or any combination thereof. The system also includes at least one processor in communication with the database, and the at least one processor is programmed or configured to receive the transaction data. The at least one processor is further programmed or configured to automatically generate, for each point of interest of the plurality of points of interest, at least one POI rating based at least partially on the transaction data for the point of interest. The at least one POI rating includes: a popularity rating based at least partially on a frequency of financial transactions at the point of interest; a locality rating based at least partially on the locality of the plurality of individuals associated with the financial transactions at the point of interest; a crowd density rating based at least partially on a correlation between a frequency and the transaction time of financial transactions at the point of interest; a cost rating based at least partially on the transaction amount associated with each financial transaction at the point of interest; or any combination thereof. The at least one processor is further programmed or configured to, in response to a selection of a chosen point of interest of the plurality of points of interest, provide to at least one user the at least one POI rating associated with the chosen point of interest.

In some non-limiting embodiments or aspects, the at least one processor may be programmed or configured to update in real time the at least one POI rating for each point of interest of the plurality of points of interest when a new financial transaction occurs at the point of interest. The transaction data may include at least a transaction amount, a transaction time, and a locality of the plurality of individuals. The at least one POI rating may include the locality rating and may also include the crowd density rating. The at least one POI rating may further include the popularity rating and the cost rating. The crowd density rating may be determined relative to the transaction capacity of the point of interest.

In some non-limiting embodiments or aspects, the at least one processor may be programmed or configured to generate display data configured to generate on a display device a representation of at least one point of interest of the plurality of points of interest. The display data also may be configured to provide a visual representation of the at least one POI rating in association with the at least one point of interest. The at least one processor also may be programmed or configured to obtain at least one third-party rating associated with the chosen point of interest, and, in response to the selection of the chosen point of interest of the plurality of points of interest, provide to the at least one user the at least one third-party rating along with the at least one POI rating associated with the chosen point of interest for comparison by the at least one user.

In non-limiting embodiments or the at least one processor may be programmed or configured to automatically generate a confidence score of the at least one third-party rating based at least partially on a comparison to the at least one POI rating associated with the chosen point of interest. The at least one processor also may be programmed or configured to, in response to the selection of the chosen point of interest of the plurality of points of interest, provide the confidence score to the at least one user. The at least one processor may be programmed or configured to automatically generate at least one combined rating based at least partially on a combination of the at least one third-party rating and the at least one POI rating. The at least one processor also may be programmed or configured to, in response to the selection of the chosen point of interest of the plurality of points of interest, provide the at least one combined rating to the at least one user. The at least one processor may be programmed or configured to automatically generate at least one recommended point of interest of the plurality of points of interest based at least partially on the at least one POI rating associated with the at least one recommended point of interest and at least one of the following data: personal information of the at least one user, a preference of the at least one user, a location of the at least one user, or any combination thereof. The at least one processor also may be programmed or configured to provide to the at least one user the at least one recommended point of interest.

According to some non-limiting embodiments or aspects, provided is a computer-implemented method for displaying ratings associated with a plurality of points of interest in a region. The computer-implemented method includes generating display data based at least partially on at least one POI rating. The at least one POI rating is associated with each point of interest of the plurality of points of interest and is based at least partially on transaction data for the point of interest. The display data is configured to generate on at least one display device a geographic representation of at least one point of interest of the plurality of points of interest on a visual map display of at least a portion of the region. The display data is further configured to provide a visual representation of the at least one POI rating in association with the at least one point of interest. The method also includes providing the display data for presentation to at least one user on the at least one display device. The method further includes, in response to a selection by the at least one user of a chosen point of interest of the plurality of points of interest, providing for display to the at least one user the at least one POI rating associated with the chosen point of interest on the visual map display. The visual map display of the at least a portion of the region is displayed in an augmented reality or virtual reality environment as a three-dimensional augmented reality map or virtual reality map. The at least one point of interest of the plurality of points of interest is represented spatially on the visual map display according to a geographical location of the at least one point of interest.

In some non-limiting embodiments or aspects, the computer-implemented method may include, in response to a selection by the at least one user of a rating of the at least one POI rating, updating the display data to alter the visual representation of each point of interest of the at least one point of interest according to a value of the selected rating of the point of interest. The method may also include updating the display data in real time as the at least one POI rating associated with each point of interest of the plurality of points of interest changes in response to the occurrence of ongoing financial transactions. The method may further include, in response to an input by the at least one user of at least one filter corresponding to a metric of the at least one POI rating, updating the display data to provide a visual representation of a filtered subset of points of interest of the plurality of points of interest on the visual map display.

In some non-limiting embodiments or aspects, the computer-implemented method may include providing a visual representation of the location of the at least one user on the visual map display in relation to the at least one point of interest. The method may also include providing a visual representation of the location of the at least one user on the visual map display in relation to the at least one point of interest and at least one automatically generated recommended point of interest. The method may include generating the display data based at least partially on at least one third-party rating associated with the chosen point of interest. The method may also include, in response to the selection of the chosen point of interest of the plurality of points of interest, providing for display on the visual map display the at least one third-party rating along with the at least one POI rating associated with the chosen point of interest for comparison by the at least one user. The method may further include generating the display data based at least partially on at least one confidence score of the at least one third-party rating, and, in response to the selection of the chosen point of interest of the plurality of points of interest, providing the confidence score for display to the at least one user. The display data may be further configured to visually represent each point of interest of the plurality of points of interest according to a rating value within a predetermined range of rating values for the at least one POI rating, such that a graphical feature of each point of interest is determined by the rating value. The graphical feature may include at least one of the following: a point of interest color, an associated graph, an associated graphical icon, a point of interest size, a point of interest highlight, or any combination thereof.

According to some non-limiting embodiments or aspects, provided is a system for displaying ratings associated with a plurality of points of interest in a region. The system includes a database comprising transaction data from a plurality of points of interest. The system also includes at least one processor in communication with the database. The at least one processor is programmed or configured to generate display data based at least partially on at least one POI rating. The at least one POI rating is associated with each point of interest of the plurality of points of interest and is based at least partially on transaction data for the point of interest. The display data is configured to generate on at least one display device a geographic representation of at least one point of interest of the plurality of points of interest on a visual map display of at least a portion of the region. The display data is further configured to provide a visual representation of the at least one POI rating in association with the at least one point of interest. The at least one processor is also programmed or configured to provide the display data for presentation to at least one user on the at least one display device. The at least one processor is further programmed or configured to, in response to a selection by the at least one user of a chosen point of interest of the plurality of points of interest, provide for display to the at least one user the at least one POI rating associated with the chosen point of interest on the visual map display. The visual map display of the at least a portion of the region is displayed in an augmented reality or virtual reality environment as a three-dimensional augmented reality map or virtual reality map. The at least one point of interest of the plurality of points of interest is represented spatially on the visual map display according to a geographical location of the at least one point of interest.

In some non-limiting embodiments or aspects, the at least one processor may be programmed or configured to, in response to a selection by the at least one user of a rating of the at least one POI rating, update the display data to alter the visual representation of each point of interest of the at least one point of interest according to a value of the selected rating of the point of interest. The at least one processor also may be programmed or configured to update the display data in real time as the at least one POI rating associated with each point of interest of the plurality of points of interest changes in response to the occurrence of ongoing financial transactions. The at least one processor may be further programmed or configured to, in response to an input by the at least one user of at least one filter corresponding to a metric of the at least one POI rating, update the display data to provide a visual representation of a filtered subset of points of interest of the plurality of points of interest on the visual map display.

In some non-limiting embodiments or aspects, the at least one processor may be programmed or configured to provide a visual representation of the location of the at least one user on the visual map display in relation to the at least one point of interest. The at least one processor also may be programmed or configured to provide a visual representation of the location of the at least one user on the visual map display in relation to the at least one point of interest and at least one automatically generated recommended point of interest. The at least one processor may be programmed or configured to generate the display data based at least partially on at least one third-party rating associated with the chosen point of interest. The at least one processor also may be programmed or configured to, in response to the selection of the chosen point of interest of the plurality of points of interest, provide for display on the visual map display the at least one third-party rating along with the at least one POI rating associated with the chosen point of interest for comparison by the at least one user. The at least one processor may be programmed or configured to generate the display data based at least partially on at least one confidence score of the at least one third-party rating. The at least one processor also may be programmed or configured to, in response to the selection of the chosen point of interest of the plurality of points of interest, provide the confidence score for display to the at least one user. The display data may be further configured to visually represent each point of interest of the plurality of points of interest according to a rating value within a predetermined range of rating values for the at least one POI rating, such that a graphical feature of each point of interest is determined by the rating value. The graphical feature may include at least one of the following: a point of interest color, an associated graph, an associated graphical icon, a point of interest size, a point of interest highlight, or any combination thereof.

Further non-limiting embodiments or aspects are set forth in the following numbered clauses:

Clause 1: A computer-implemented method for generating ratings for points of interest in a region, comprising: receiving transaction data from a plurality of points of interest, the transaction data representing financial transactions between a plurality of individuals and each point of interest of the plurality of points of interest and comprising at least one of the following: transaction count, transaction amount, transaction time, locality of the plurality of individuals, or any combination thereof; automatically generating, for each point of interest of the plurality of points of interest, at least one POI rating based at least partially on the transaction data for the point of interest, the at least one POI rating comprising at least one of the following: a popularity rating based at least partially on a frequency of financial transactions at the point of interest, a locality rating based at least partially on the locality of the plurality of individuals associated with the financial transactions at the point of interest, a crowd density rating based at least partially on a correlation between a frequency and the transaction time of financial transactions at the point of interest, a cost rating based at least partially on the transaction amount associated with each financial transaction at the point of interest, or any combination thereof; and in response to a selection of a chosen point of interest of the plurality of points of interest, providing to at least one user the at least one POI rating associated with the chosen point of interest.

Clause 2: The computer-implemented method of clause 1, further comprising updating in real time the at least one POI rating for each point of interest of the plurality of points of interest when a new financial transaction occurs at the point of interest.

Clause 3: The computer-implemented method of clauses 1 or 2, wherein the transaction data comprises at least a transaction amount, a transaction time, and a locality of the plurality of individuals.

Clause 4: The computer-implemented method of any of clauses 1-3, wherein the at least one POI rating comprises the locality rating.

Clause 5: The computer-implemented method of any of clauses 1-4, wherein the at least one POI rating comprises the crowd density rating.

Clause 6: The computer-implemented method of any of clauses 1-5, wherein the at least one POI rating comprises the popularity rating and the cost rating.

Clause 7: The computer-implemented method of any of clauses 1-6, wherein the crowd density rating is determined relative to the transaction capacity of the point of interest.

Clause 8: The computer-implemented method of any of clauses 1-7, further comprising generating display data configured to generate on a display device a representation of at least one point of interest of the plurality of points of interest, the display data further configured to provide a visual representation of the at least one POI rating in association with the at least one point of interest.

Clause 9: The computer-implemented method of any of clauses 1-8, further comprising: obtaining at least one third-party rating associated with the chosen point of interest; and in response to the selection of the chosen point of interest of the plurality of points of interest, providing to the at least one user the at least one third-party rating along with the at least one POI rating associated with the chosen point of interest for comparison by the at least one user.

Clause 10: The computer-implemented method of any of clauses 1-9, further comprising: automatically generating a confidence score of the at least one third-party rating based at least partially on a comparison to the at least one POI rating associated with the chosen point of interest; and in response to the selection of the chosen point of interest of the plurality of points of interest, providing the confidence score to the at least one user.

Clause 11: The computer-implemented method of any of clauses 1-10, further comprising: automatically generating at least one combined rating based at least partially on a combination of the at least one third-party rating and the at least one POI rating; and in response to the selection of the chosen point of interest of the plurality of points of interest, providing the at least one combined rating to the at least one user.

Clause 12: The computer-implemented method of any of clauses 1-11, further comprising: automatically generating at least one recommended point of interest of the plurality of points of interest based at least partially on the at least one POI rating associated with the at least one recommended point of interest and at least one of the following data: personal information of the at least one user, a preference of the at least one user, a location of the at least one user, or any combination thereof; and providing to the at least one user the at least one recommended point of interest.

Clause 13: A system for generating ratings for points of interest in a region, comprising: a database comprising transaction data from a plurality of points of interest, the transaction data representing financial transactions between a plurality of individuals and each point of interest of the plurality of points of interest and comprising at least one of the following: transaction count, transaction amount, transaction time, locality of the plurality of individuals, or any combination thereof; at least one processor in communication with the database, the at least one processor programmed or configured to: receive the transaction data; automatically generate, for each point of interest of the plurality of points of interest, at least one POI rating based at least partially on the transaction data for the point of interest, the at least one POI rating comprising at least one of the following: a popularity rating based at least partially on a frequency of financial transactions at the point of interest, a locality rating based at least partially on the locality of the plurality of individuals associated with the financial transactions at the point of interest, a crowd density rating based at least partially on a correlation between a frequency and the transaction time of financial transactions at the point of interest, a cost rating based at least partially on the transaction amount associated with each financial transaction at the point of interest, or any combination thereof; and in response to a selection of a chosen point of interest of the plurality of points of interest, provide to at least one user the at least one POI rating associated with the chosen point of interest.

Clause 14: The system of clause 13, wherein the at least one processor is further programmed or configured to update in real time the at least one POI rating for each point of interest of the plurality of points of interest when a new financial transaction occurs at the point of interest.

Clause 15: The system of clause 13 or 14, wherein the transaction data comprises at least a transaction amount, a transaction time, and a locality of the plurality of individuals.

Clause 16: The system of any of clauses 13-15, wherein the at least one POI rating comprises the locality rating.

Clause 17: The system of any of clauses 13-16, wherein the at least one POI rating comprises the crowd density rating.

Clause 18: The system of any of clauses 13-17, wherein the at least one POI rating comprises the popularity rating and the cost rating.

Clause 19: The system of any of clauses 13-18, wherein the crowd density rating is determined relative to the transaction capacity of the point of interest.

Clause 20: The system of any of clauses 13-19, wherein the at least one processor is further programmed or configured to generate display data configured to generate on a display device a representation of at least one point of interest of the plurality of points of interest, the display data further configured to provide a visual representation of the at least one POI rating in association with the at least one point of interest.

Clause 21: The system of any of clauses 13-20, wherein the at least one processor is further programmed or configured to: obtain at least one third-party rating associated with the chosen point of interest; and in response to the selection of the chosen point of interest of the plurality of points of interest, provide to the at least one user the at least one third-party rating along with the at least one POI rating associated with the chosen point of interest for comparison by the at least one user.

Clause 22: The system of any of clauses 13-21, wherein the at least one processor is further programmed or configured to: automatically generate a confidence score of the at least one third-party rating based at least partially on a comparison to the at least one POI rating associated with the chosen point of interest; and in response to the selection of the chosen point of interest of the plurality of points of interest, provide the confidence score to the at least one user.

Clause 23: The system of any of clauses 13-22, wherein the at least one processor is further programmed or configured to: automatically generate at least one combined rating based at least partially on a combination of the at least one third-party rating and the at least one POI rating; and in response to the selection of the chosen point of interest of the plurality of points of interest, provide the at least one combined rating to the at least one user.

Clause 24: The system of any of clauses 13-23, wherein the at least one processor is further programmed or configured to: automatically generate at least one recommended point of interest of the plurality of points of interest based at least partially on the at least one POI rating associated with the at least one recommended point of interest and at least one of the following data: personal information of the at least one user, a preference of the at least one user, a location of the at least one user, or any combination thereof; and provide to the at least one user the at least one recommended point of interest.

Clause 25: A computer-implemented method for displaying ratings associated with a plurality of points of interest in a region, comprising: generating display data based at least partially on at least one POI rating, the at least one POI rating associated with each point of interest of the plurality of points of interest and based at least partially on transaction data for the point of interest, the display data configured to generate on at least one display device a geographic representation of at least one point of interest of the plurality of points of interest on a visual map display of at least a portion of the region, the display data further configured to provide a visual representation of the at least one POI rating in association with the at least one point of interest; providing the display data for presentation to at least one user on the at least one display device; and in response to a selection by the at least one user of a chosen point of interest of the plurality of points of interest, providing for display to the at least one user the at least one POI rating associated with the chosen point of interest on the visual map display, wherein the visual map display of the at least a portion of the region is displayed in an augmented reality or virtual reality environment as a three-dimensional augmented reality map or virtual reality map and the at least one point of interest of the plurality of points of interest is represented spatially on the visual map display according to a geographical location of the at least one point of interest.

Clause 26: The computer-implemented method of clause 25, further comprising, in response to a selection by the at least one user of a rating of the at least one POI rating, updating the display data to alter the visual representation of each point of interest of the at least one point of interest according to a value of the selected rating of the point of interest.

Clause 27: The computer-implemented method of clause 25 or 26, further comprising updating the display data in real time as the at least one POI rating associated with each point of interest of the plurality of points of interest changes in response to the occurrence of ongoing financial transactions.

Clause 28: The computer-implemented method of any of clauses 25-27, further comprising, in response to an input by the at least one user of at least one filter corresponding to a metric of the at least one POI rating, updating the display data to provide a visual representation of a filtered subset of points of interest of the plurality of points of interest on the visual map display.

Clause 29: The computer-implemented method of any of clauses 25-28, further comprising providing a visual representation of the location of the at least one user on the visual map display in relation to the at least one point of interest.

Clause 30: The computer-implemented method of any of clauses 25-29, further comprising providing a visual representation of the location of the at least one user on the visual map display in relation to the at least one point of interest and at least one automatically generated recommended point of interest.

Clause 31: The computer-implemented method of any of clauses 25-30, further comprising: generating the display data based at least partially on at least one third-party rating associated with the chosen point of interest; and in response to the selection of the chosen point of interest of the plurality of points of interest, providing for display on the visual map display the at least one third-party rating along with the at least one POI rating associated with the chosen point of interest for comparison by the at least one user.

Clause 32: The computer-implemented method of any of clauses 25-31, further comprising: generating the display data based at least partially on at least one confidence score of the at least one third-party rating; and in response to the selection of the chosen point of interest of the plurality of points of interest, providing the confidence score for display to the at least one user.

Clause 33: The computer-implemented method of any of clauses 25-32, wherein the display data is further configured to visually represent each point of interest of the plurality of points of interest according to a rating value within a predetermined range of rating values for the at least one POI rating, such that a graphical feature of each point of interest is determined by the rating value, the graphical feature comprising at least one of the following: a point of interest color, an associated graph, an associated graphical icon, a point of interest size, a point of interest highlight, or any combination thereof.

Clause 34: A system for displaying ratings associated with a plurality of points of interest in a region, comprising: a database comprising transaction data from a plurality of points of interest; at least one processor in communication with the database, the at least one processor programmed or configured to: generate display data based at least partially on at least one POI rating, the at least one POI rating associated with each point of interest of the plurality of points of interest and based at least partially on transaction data for the point of interest, the display data configured to generate on at least one display device a geographic representation of at least one point of interest of the plurality of points of interest on a visual map display of at least a portion of the region, the display data further configured to provide a visual representation of the at least one POI rating in association with the at least one point of interest; provide the display data for presentation to at least one user on the at least one display device; and in response to a selection by the at least one user of a chosen point of interest of the plurality of points of interest, provide for display to the at least one user the at least one POI rating associated with the chosen point of interest on the visual map display, wherein the visual map display of the at least a portion of the region is displayed in an augmented reality or virtual reality environment as a three-dimensional augmented reality map or virtual reality map and the at least one point of interest of the plurality of points of interest is represented spatially on the visual map display according to a geographical location of the at least one point of interest.

Clause 35: The system of clause 34, wherein the at least one processor is further programmed or configured to, in response to a selection by the at least one user of a rating of the at least one POI rating, update the display data to alter the visual representation of each point of interest of the at least one point of interest according to a value of the selected rating of the point of interest.

Clause 36: The system of clause 34 or 35, wherein the at least one processor is further programmed or configured to update the display data in real time as the at least one POI rating associated with each point of interest of the plurality of points of interest changes in response to the occurrence of ongoing financial transactions.

Clause 37: The system of any of clauses 34-36, wherein the at least one processor is further programmed or configured to, in response to an input by the at least one user of at least one filter corresponding to a metric of the at least one POI rating, update the display data to provide a visual representation of a filtered subset of points of interest of the plurality of points of interest on the visual map display.

Clause 38: The system of any of clauses 34-37, wherein the at least one processor is further programmed or configured to provide a visual representation of the location of the at least one user on the visual map display in relation to the at least one point of interest.

Clause 39: The system of any of clauses 34-38, wherein the at least one processor is further programmed or configured to provide a visual representation of the location of the at least one user on the visual map display in relation to the at least one point of interest and at least one automatically generated recommended point of interest.

Clause 40: The system of any of clauses 34-39, wherein the at least one processor is further programmed or configured to: generate the display data based at least partially on at least one third-party rating associated with the chosen point of interest; and in response to the selection of the chosen point of interest of the plurality of points of interest, provide for display on the visual map display the at least one third-party rating along with the at least one POI rating associated with the chosen point of interest for comparison by the at least one user.

Clause 41: The system of any of clauses 34-40, wherein the at least one processor is further programmed or configured to: generate the display data based at least partially on at least one confidence score of the at least one third-party rating; and in response to the selection of the chosen point of interest of the plurality of points of interest, provide the confidence score for display to the at least one user.

Clause 42: The system of any of clauses 34-41, wherein the display data is further configured to visually represent each point of interest of the plurality of points of interest according to a rating value within a predetermined range of rating values for the at least one POI rating, such that a graphical feature of each point of interest is determined by the rating value, the graphical feature comprising at least one of the following: a point of interest color, an associated graph, an associated graphical icon, a point of interest size, a point of interest highlight, or any combination thereof.

Clause 43: A computer-implemented method for generating ratings for points of interest in a region, comprising: receiving transaction data from a plurality of points of interest, the transaction data representing financial transactions between a plurality of individuals and each point of interest of the plurality of points of interest and comprising at least one of the following: transaction count, transaction amount, transaction time, locality of the plurality of individuals, or any combination thereof; automatically generating, for each point of interest of the plurality of points of interest, at least one POI rating based at least partially on the transaction data for the point of interest, the at least one POI rating comprising at least one of the following: a popularity rating based at least partially on a frequency of financial transactions at the point of interest, a locality rating based at least partially on the locality of the plurality of individuals associated with the financial transactions at the point of interest, a crowd density rating based at least partially on a correlation between a frequency and the transaction time of financial transactions at the point of interest, a cost rating based at least partially on the transaction amount associated with each financial transaction at the point of interest, or any combination thereof; and in response to a selection of a chosen point of interest of the plurality of points of interest, providing to at least one user the at least one POI rating associated with the chosen point of interest.

Clause 44: The computer-implemented method of clause 43, further comprising updating in real time the at least one POI rating for each point of interest of the plurality of points of interest when a new financial transaction occurs at the point of interest.

Clause 45: The computer-implemented method of clause 43 or 44, wherein the transaction data comprises at least a transaction amount, a transaction time, and a locality of the plurality of individuals.

Clause 46: The computer-implemented method of any of clauses 43-45, wherein the at least one POI rating comprises the locality rating.

Clause 47: The computer-implemented method of any of clauses 43-46, wherein the at least one POI rating comprises the crowd density rating.

Clause 48: The computer-implemented method of any of clauses 43-47, wherein the at least one POI rating comprises the popularity rating and the cost rating.

Clause 49: The computer-implemented method of any of clauses 43-48, wherein a crowd density rating is determined relative to the transaction capacity of the point of interest.

Clause 50: The computer-implemented method of any of clauses 43-49, further comprising generating display data configured to generate on a display device a representation of at least one point of interest of the plurality of points of interest, the display data further configured to provide a visual representation of the at least one POI rating in association with the at least one point of interest.

Clause 51: The computer-implemented method of any of clauses 43-50, further comprising: obtaining at least one third-party rating associated with the chosen point of interest; and in response to the selection of the chosen point of interest of the plurality of points of interest, providing to the at least one user the at least one third-party rating along with the at least one POI rating associated with the chosen point of interest for comparison by the at least one user.

Clause 52: The computer-implemented method of any of clauses 43-51, further comprising: automatically generating a confidence score of the at least one third-party rating based at least partially on a comparison to the at least one POI rating associated with the chosen point of interest; and in response to the selection of the chosen point of interest of the plurality of points of interest, providing the confidence score to the at least one user.

Clause 53: The computer-implemented method of any of clauses 43-52, further comprising: automatically generating at least one combined rating based at least partially on a combination of the at least one third-party rating and the at least one POI rating; and in response to the selection of the chosen point of interest of the plurality of points of interest, providing the at least one combined rating to the at least one user.

Clause 54: The computer-implemented method of any of clauses 43-53, further comprising: automatically generating at least one recommended point of interest of the plurality of points of interest based at least partially on the at least one POI rating associated with the at least one recommended point of interest and at least one of the following data: personal information of the at least one user, a preference of the at least one user, a location of the at least one user, or any combination thereof; and providing to the at least one user the at least one recommended point of interest.

Clause 55: A system for generating ratings for points of interest in a region, comprising: a database comprising transaction data from a plurality of points of interest, the transaction data representing financial transactions between a plurality of individuals and each point of interest of the plurality of points of interest and comprising at least one of the following: transaction count, transaction amount, transaction time, locality of the plurality of individuals, or any combination thereof; at least one processor in communication with the database, the at least one processor programmed or configured to: receive the transaction data; automatically generate, for each point of interest of the plurality of points of interest, at least one POI rating based at least partially on the transaction data for the point of interest, the at least one POI rating comprising at least one of the following: a popularity rating based at least partially on a frequency of financial transactions at the point of interest, a locality rating based at least partially on the locality of the plurality of individuals associated with the financial transactions at the point of interest, a crowd density rating based at least partially on a correlation between a frequency and the transaction time of financial transactions at the point of interest, a cost rating based at least partially on the transaction amount associated with each financial transaction at the point of interest, or any combination thereof; and in response to a selection of a chosen point of interest of the plurality of points of interest, provide to at least one user the at least one POI rating associated with the chosen point of interest.

Clause 56: The system of clause 55, wherein the at least one processor is further programmed or configured to update in real time the at least one POI rating for each point of interest of the plurality of points of interest when a new financial transaction occurs at the point of interest.

Clause 57: The system of clause 55 or 56, wherein the at least one POI rating comprises at least one of the following: the locality rating, the crowd density rating, the popularity rating, the cost rating, or any combination thereof.

Clause 58: A computer-implemented method for displaying ratings associated with a plurality of points of interest in a region, comprising: generating display data based at least partially on at least one POI rating, the at least one POI rating associated with each point of interest of the plurality of points of interest and based at least partially on transaction data for the point of interest, the display data configured to generate on at least one display device a geographic representation of at least one point of interest of the plurality of points of interest on a visual map display of at least a portion of the region, the display data further configured to provide a visual representation of the at least one POI rating in association with the at least one point of interest; providing the display data for presentation to at least one user on the at least one display device; and in response to a selection by the at least one user of a chosen point of interest of the plurality of points of interest, providing for display to the at least one user the at least one POI rating associated with the chosen point of interest on the visual map display, wherein the visual map display of the at least a portion of the region is displayed in an augmented reality or virtual reality environment as a three-dimensional augmented reality map or virtual reality map and the at least one point of interest of the plurality of points of interest is represented spatially on the visual map display according to a geographical location of the at least one point of interest.

Clause 59: The computer-implemented method of clause 58, further comprising, in response to a selection by the at least one user of a rating of the at least one POI rating, updating the display data to alter the visual representation of each point of interest of the at least one point of interest according to a value of the selected rating of the point of interest.

Clause 60: The computer-implemented method of any of clause 58 or 59, further comprising updating the display data in real time as the at least one POI rating associated with each point of interest of the plurality of points of interest changes in response to the occurrence of ongoing financial transactions.

Clause 61. The computer-implemented method of any of clauses 58-60, further comprising, in response to an input by the at least one user of at least one filter corresponding to a metric of the at least one POI rating, updating the display data to provide a visual representation of a filtered subset of points of interest of the plurality of points of interest on the visual map display.

Clause 62: The computer-implemented method of any of clauses 58-61, further comprising providing a visual representation of the location of the at least one user on the visual map display in relation to the at least one point of interest.

Clause 63: The computer-implemented method of any of clauses 58-62, further comprising providing a visual representation of the location of the at least one user on the visual map display in relation to the at least one point of interest and at least one automatically generated recommended point of interest.

Clause 64: The computer-implemented method of any of clauses 58-63, further comprising: generating the display data based at least partially on at least one third-party rating associated with the chosen point of interest; and in response to the selection of the chosen point of interest of the plurality of points of interest, providing for display on the visual map display the at least one third-party rating along with the at least one POI rating associated with the chosen point of interest for comparison by the at least one user.

Clause 65: The computer-implemented method of any of clauses 58-64, further comprising: generating the display data based at least partially on at least one confidence score of the at least one third-party rating; and in response to the selection of the chosen point of interest of the plurality of points of interest, providing the confidence score for display to the at least one user.

Clause 66: The computer-implemented method of any of clauses 58-65, wherein the display data is further configured to visually represent each point of interest of the plurality of points of interest according to a rating value within a predetermined range of rating values for the at least one POI rating, such that a graphical feature of each point of interest is determined by the rating value, the graphical feature comprising at least one of the following: a point of interest color, an associated graph, an associated graphical icon, a point of interest size, a point of interest highlight, or any combination thereof.

Clause 67: A system for displaying ratings associated with a plurality of points of interest in a region, comprising: a database comprising transaction data from a plurality of points of interest; at least one processor in communication with the database, the at least one processor programmed or configured to: generate display data based at least partially on at least one POI rating, the at least one POI rating associated with each point of interest of the plurality of points of interest and based at least partially on transaction data for the point of interest, the display data configured to generate on at least one display device a geographic representation of at least one point of interest of the plurality of points of interest on a visual map display of at least a portion of the region, the display data further configured to provide a visual representation of the at least one POI rating in association with the at least one point of interest; provide the display data for presentation to at least one user on the at least one display device; and in response to a selection by the at least one user of a chosen point of interest of the plurality of points of interest, provide for display to the at least one user the at least one POI rating associated with the chosen point of interest on the visual map display, wherein the visual map display of the at least a portion of the region is displayed in an augmented reality or virtual reality environment as a three-dimensional augmented reality map or virtual reality map and the at least one point of interest of the plurality of points of interest is represented spatially on the visual map display according to a geographical location of the at least one point of interest.

Clause 68: The system of clause 67, wherein the at least one processor is further programmed or configured to, in response to a selection by the at least one user of a rating of the at least one POI rating, update the display data to alter the visual representation of each point of interest of the at least one point of interest according to a value of the selected rating of the point of interest.

Clause 69. The system of clause 67 or 68, wherein the at least one processor is further programmed or configured to update the display data in real time as the at least one POI rating associated with each point of interest of the plurality of points of interest changes in response to the occurrence of ongoing financial transactions.

Clause 70: The system of any of clauses 67-69, wherein the at least one processor is further programmed or configured to, in response to an input by the at least one user of at least one filter corresponding to a metric of the at least one POI rating, update the display data to provide a visual representation of a filtered subset of points of interest of the plurality of points of interest on the visual map display.

Clause 71. The system of any of clauses 67-70, wherein the at least one processor is further programmed or configured to provide a visual representation of the location of the at least one user on the visual map display in relation to the at least one point of interest.

Clause 72: The system of any of clauses 67-71, wherein the at least one processor is further programmed or configured to provide a visual representation of the location of the at least one user on the visual map display in relation to the at least one point of interest and at least one automatically generated recommended point of interest.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
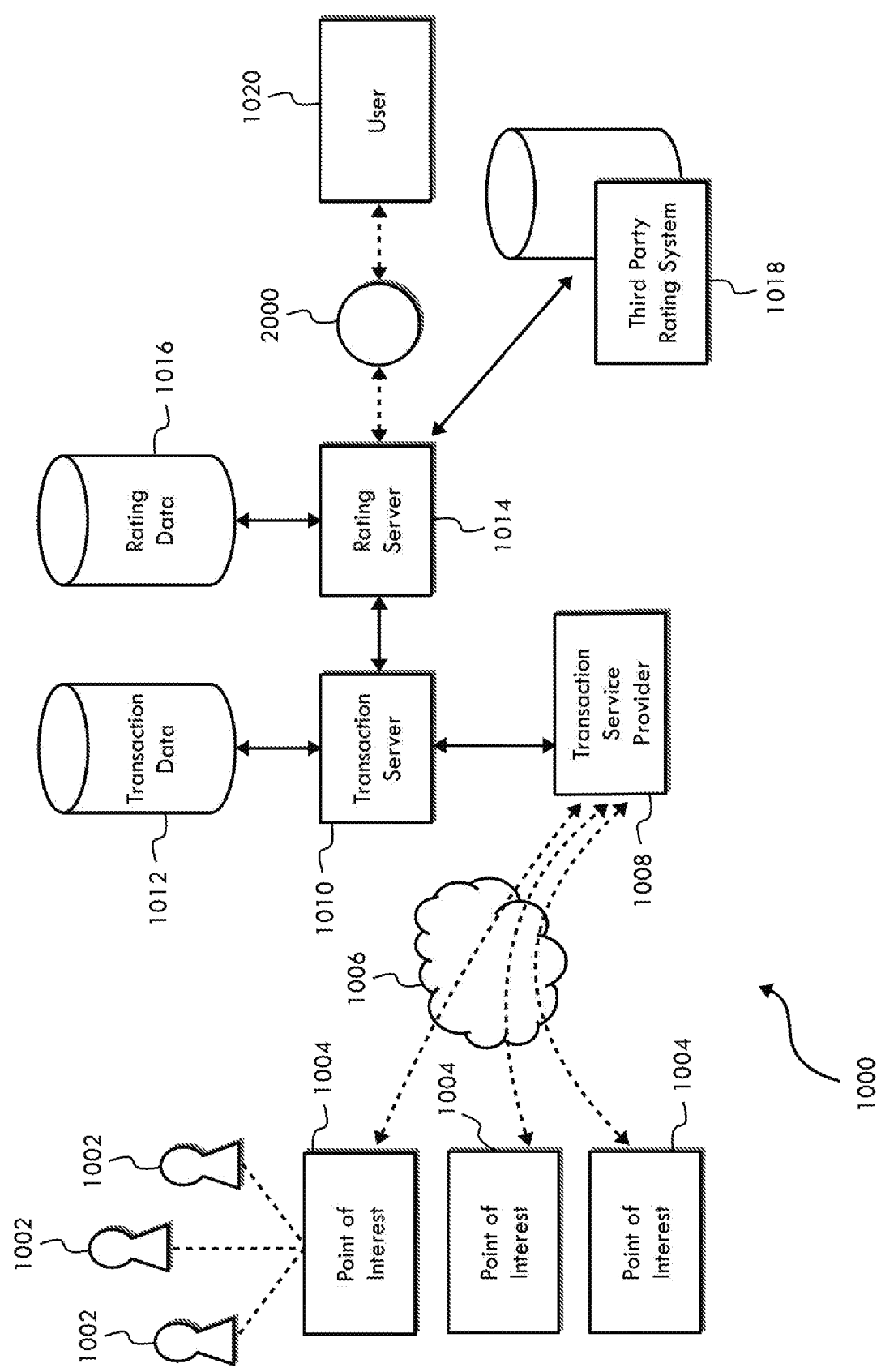
FIG. 1 is a schematic diagram of one embodiment or aspect of a system for generating and displaying ratings for points of interest in a region according the principles of the present disclosure.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least in partially on" unless explicitly stated otherwise.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system" or "point-of-sale (POS) device" as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network. A client device may further include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a point of sale (POS) system, and/or any other device, system, and/or software application configured to communicate with a remote device or system.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay™, Apple Pay®, Samsung Pay®, and/or other like electronic payment systems. In some non-limiting examples, an issuer bank may be an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "financial device" may refer to a portable payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant, a security card, an access card, a wireless terminal, and/or a transponder, as examples. The financial device may include a volatile or a non-volatile memory to store information, such as an account identifier or a name of the account holder. The financial device may store account credentials locally on the device, in digital or non-digital representation, or may facilitate accessing account credentials stored in a medium that is accessible by the financial device in a connected network.

As used herein, the terms "point of interest" (POI) and/or "merchant" refer to any individual or entity that provides goods and/or services, or access to goods and/or services, to customers based on a transaction, such as a payment transaction. Points of interest and merchants may include, but are not limited to, restaurants, food trucks, clubs, gymnasiums, retail stores, professional services providers (e.g., dentists, doctors, plumbers, etc.), parks, museums, attractions, sporting venues, and/or the like. It will be appreciated that numerous other types of points of interest are within the scope of this disclosure.

As used herein, the term "POI rating" may refer to at least one rank, number, category, score, range, or any combination thereof, representative of one or more aspects of a point of interest. A POI rating may be quantitative or qualitative. Non-limiting POI ratings are described herein below.

Non-limiting embodiments or aspects of the present disclosure are directed to a system and method for generating and displaying ratings for points of interest in a region. Embodiments or aspects of the present disclosure provide the environment and infrastructure for receiving transaction data across a number of points of interest in a region and further analyzing, generating, and/or extracting useful metrics related to the points of interest. Embodiments or aspects of the present disclosure improve upon and use existing payment processing infrastructure and data flow to automatically receive transaction data, which may be used to automatically generate ratings for points of interest, and, in particular, in real time as transactions occur. Merchants may use the ratings to make changes to their services or point of sale systems, and the ratings may also inform users' next transactions, providing additional transaction data. Such ratings may be generated without manual input by customers, merchants, or transaction service providers, thereby eliminating bias or skewed data caused by subjective manual input. Furthermore, embodiments or aspects of the present disclosure sure provide the tools and systems for displaying the generated ratings to users in an immersive and interactive display environment. Non-limiting embodiments or aspects of the present disclosure provide for displaying the ratings in augmented or virtual reality environments, visually associating the ratings with the geographic locations of points of interest and users. In this manner, the system leverages transaction networks to provide users with real-time, accurate POI ratings in an interactive display environment.

With specific reference to FIG. 1, and in some non-limiting embodiments or aspects, provided is a system 1000 for generating and displaying ratings for points of interest 1004 in a region. At any given time, customers 1002 are engaging in financial transactions with any one of a number of points of interest 1004. A customer 1002 may use a portable financial device, e.g., a credit card, a debit card, a prepaid card, an electronic wallet application, and/or the like, to complete financial transactions with various points of interest 1004 in a region. A merchant system or point-of-sale system associated with a given point of interest 1004 communicates with a transaction service provider 1008 and/or transaction server 1010 over a network 1006 to complete payment of the financial transaction. The transaction data is communicated to the transaction server 1010 for the purpose of completing the transaction and storing the transaction data in a transaction database 1012. The transaction data may include, but is not limited to, transaction count, transaction amount, transaction time, locality of the individual who made the transaction, merchant category, merchant identifier, or any combination thereof.

With further reference to FIG. 1, and in some non-limiting embodiments or aspects, a rating server 1014, associated with a transaction service provider 1008 or another entity, then accesses the stored transaction data, either directly or indirectly, through the transaction server 1010. The rating server 1014 automatically generates ratings for each point of interest 1004 that has produced transaction data. Such point of interest ratings (also herein referred to as "POI ratings") may include, but are not limited to: a popularity rating based at least partially on a frequency of financial transactions at the point of interest 1004; a locality rating based at least partially on the locality of the plurality of individuals associated with the financial transactions at the point of interest 1004; a crowd density rating based at least partially on a correlation between a frequency and the transaction time(s) of financial transactions at the point of interest 1004; a cost rating based at least partially on the transaction amount associated with each financial transaction at the point of interest 1004; or any combination thereof. POI ratings may be normalized or calculated according to a specific range, percentage, or category. It will be appreciated that there are a number of alternative ways to compute the POI ratings given a collection of transaction data comprising transaction amount and transaction time, as related to a unique individual with a known locality.

Regarding popularity, a corresponding POI rating may be calculated by the following formula:

$$0 \leq \frac{\text{Transaction Rate}_{POI}}{\max(\text{Transaction Rate}_{AllPOI})} \leq 1 \quad \text{(Formula A)}$$

where the numerator is calculated by determining the number of transactions in a given time period for a POI, and the denominator is calculated by determining the maximum transaction rate in the time period across all points of interest (i.e., "All POI"), which may be all points of interest in a given region, city, zip code, area, circumference, POI category, and/or the like, which may be defined by a user. This formula has an inclusive range of 0 and 1 for ease of calculating other values or percentages, or for converting to categorical labels, but other configurations are possible. In the example formula, the point of interest with the highest transaction rate would have a popularity rating of 1. A point of interest that has near the maximum transaction rate would have a popularity rating closer to 1, and a point of interest that has a much smaller transaction rate than the maximum transaction rate would have a popularity rating closer to 0. A point of interest that has no transactions would have 0 popularity. By way of further example, if the transaction rate of $POI_A$ is 75 transactions/hour, and the maximum transaction rate for all points of interest in the region is 100 transactions/hour, the popularity rating would be 0.75, or 75%. This score may be compared against the ratings of other points of interest in the region, or may be converted to a categorical ranking (e.g., "very popular") based on a predetermined range of values.

It is noted that, in the preceding example formula, points of interest with a lower transaction capacity may have an artificially lowered (i.e., skewed) popularity rating; therefore, popularity may also be calculated relative to a point of interest's transaction capacity, such as according to the following formula:

$$0 \leq \frac{\text{Transaction Rate}_{POI} / \text{Transaction Capacity}_{POI}}{\max\left(\frac{\text{Transaction Rate}_{AllPOI}}{\text{Transaciton Capacity}_{AllPOI}}\right)} \leq 1 \quad \text{(Formula B)}$$

It will be appreciated that these formulas are simply exemplary and that many other configurations, calculations, and formulations are possible.

Regarding locality, a corresponding POI rating may be calculated by the following formula:

$$\frac{\sum_{j=1}^{k} \text{Distance}(\text{locality}_{POI}, \text{locality}_{Patron_j})}{k} \quad \text{(Formula C)}$$

where k=the total number of transactions at a given point of interest, or alternatively, the total number of unique individuals who patronized a given point of interest. As shown, the locality rating may be an average distance between the point of interest and the locality of the customers. For example, the locality may be a zip code, and the "Distance" function may be a geographic function that determines a distance in miles from the zip code of the point of interest to the zip code of the customer (e.g., the zip code associated with the customer's portable financial device). If "k" is treated as the number of unique individuals who patronized a given point of interest, the locality rating will be a simple average distance from the point of interest across all customers. If "k" is instead treated as the number of total transactions in a given time period, then the average distance will take into account repeat transactions by the same individual, which would more accurately reflect the locality of a random sample of customers one may encounter at the point of interest at any given time. Lower locality ratings (e.g., lower average distances) are indicative of a point of interest being patronized more by "locals." Higher locality ratings (e.g., higher average distances) are indicative of a point of interest being patronized more by "non-locals." Locality ratings also may be given categorical values based on average distances, such as "locals only" for a locality rating of 0-2 miles, "local hotspot" for a locality rating of 2-10 miles, or "tourist trap" for a locality rating of 50+ miles. It is worth noting that the distance formula may make use of a logarithmic function to reduce the effects of a tourist with a far-away locality (i.e., high outlier) from skewing the locality rating. To illustrate, if a bar has 20 transactions by customers who live 1 mile away, but 1 customer from 500 miles away made a single transaction, then the average distance rating would be nearly 25 miles, which may appear misleadingly high, compared to the median customer distance. A logarithmic function, different average function, or other compensating weighting may be used to reduce heavy bias by non-local customers. Moreover, the locality rating may be further based on or partitioned by a time of day, day of the week, month, or season, to account for changes in locality over time.

Alternatively, a locality POI rating may be calculated as follows:

$$\frac{\text{Number of Local Transactions}_{POI}}{\text{Number of Total Transactions}_{POI}} \quad \text{(Formula D)}$$

where the numerator is the number of transactions for a POI where the transaction account's associated region matches that of the POI (i.e., a "local" transaction), and the denominator is the total number of transactions at the POI. This may be interpreted as a proportion of transactions being "local." For example, transaction accounts may be associated with an address and a zip code, and the numerator may be the number of transactions where the transaction account's zip code matches the POI's zip code. Alternatively, the POI's region and the transaction account's region may be more broadly defined (e.g., a city, county, state, etc., or other custom defined region) or more narrowly defined (e.g., a borough, township, street, etc., or other custom defined region). By way of further example, if $POI_A$ has 100 transactions in a sample time period, and 76 of those transactions were from transaction accounts having the same zip code as $POI_A$, then the POI rating would be 0.76, or 76%. As with the preceding examples, this calculated score may be further processed or converted to a categorical rating based on predetermined ranges. It will be appreciated that other configurations, calculations, and formulations are possible.

Regarding crowd density, a corresponding POI rating may be calculated by the following formula:

$$0 \leq \frac{\text{Transaction Rate}_{POI}}{\text{Transaciton Capacity}_{POI}} \leq 1 \quad \text{(Formula E)}$$

where transaction rate is measured by current transactions per hour, and transaction capacity is the maximum number of transactions the point of interest can complete per hour. For any given point of interest, if historic data is unavailable, the transaction capacity may be estimated by calculating the total number of transaction points (i.e., servers, points of sale, queues, etc.) and dividing by the average amount of time required to complete one transaction. For instance, if the point of interest is a bookstore that has up to 5 cashiers, and the average transaction takes 3 minutes (or 0.05 hours), the estimated maximum transaction capacity for the bookstore would be: 5 transactions/0.05 hours=100 transactions per hour. Alternatively, with enough collected transaction data from a given point of interest, the estimated maximum capacity may be based on historical maximum numbers of transactions completed in an hour, or over some other time period. For example, if, over a week of data collection, the bookstore peaked at completing 26 transactions in a half hour, the transaction capacity for the bookstore may be set to 52 transactions per hour. Therefore, if the bookstore is operating near capacity, the crowd density rating will be closer to 1. The further from capacity, the closer the crowd density rating is to 0. Based on this example formulation, the crowd density may also be assigned a categorical rating based on where in the range the ratio falls. For example, for operation between 0% and 5% capacity, the crowd density rating may be designated as "empty." Between 5% and 25% capacity, the crowd density rating may be "low." Between 25% and 50% capacity, the crowd density rating may be "moderate." Between 50% and 75% capacity, the crowd density rating may be "high." And between 75% and 100% capacity, the crowd density rating may be "max," "full," or "packed." It will be appreciated that the crowd density rating may be tailored to specific hours, days, months, or seasons, to accommodate changes in transaction capacity, which may be affected by the number of transaction points, transaction lengths of time, or seasonality. It will also be appreciated that other formulations or categories may be used to determine the crowd density rating.

Furthermore, POI ratings that include automatically calculated metrics such as crowd density or popularity may be used as references for integrating the present disclosure into other location-based or point-of-interest services. Such services may be combined with the rating generation and display systems of the present disclosure and/or third-party systems. For instance, many third-party services are time dependent and may be better enhanced knowing the crowd density or popularity of a given point of interest. For example, transportation services, e.g., Uber, Lyft, taxi companies, and/or the like, make use of current and historic traffic data to inform an end user about travel times and costs. The POI ratings of the present disclosure may be integrated with such systems to enhance the user experience. It will be appreciated that many configurations are possible.

Regarding cost, a corresponding POI rating may be calculated by the following formula:

$$\frac{\sum_{j=1}^{k} \text{Cost}_j}{k} \quad \text{(Formula F)}$$

where k=total number of transactions. This example cost rating is calculated as an average cost, which is determined by summing the cost of each individual transaction "j" and dividing by the total number of transactions "k." This however, may not account for the fact that the cost average may be skewed by individuals with a high outlier number of transactions. An alternative formulation may be:

$$\frac{\sum_{m=1}^{n} \left( \frac{\sum_{j=1}^{k_m} \text{Cost}_j}{k_m} \right)}{n} \quad \text{(Formula G)}$$

where n=total number of unique individuals who patronized a given point of interest in a sample time period, and k=total number of transactions per individual "m." This example cost rating is, in effect, the average of each individual's average transaction cost. Whatever formula is chosen, whether it is an average, average mean, or other calculation, a dollar value or other calculated score may be converted to a categorical rating based on predetermined ranges. For example, for a point of interest that is a take-out restaurant, average costs between $0.01 and $15.00 may be categorized as "very affordable," costs between $15.00 and $25.00 may be categorized as "relatively affordable," costs between $25.00 and $40.00 may be categorized as "moderately costly," and costs higher than $40.00 may be categorized as "pricy." It will be appreciated that other formulations or categories may be used to determine a cost rating.

With further reference to FIG. 1, and in some non-limiting embodiments or aspects, the rating server 1014 may further access third-party ratings from third-party rating systems 1018, e.g., Google, Facebook, Yelp, Trip Advisor, Four Square, and/or the like. The rating server 1014 may temporarily store the third-party ratings or additionally evaluate the third-party ratings to produce comparative ratings. For example, the rating server 1014 may automatically generate a confidence score of the third-party rating based at least partially on a comparison of the third-party rating to a POI rating for a given point of interest 1004. By way of further example, if a third-party rating for a point of interest 1004 indicates high popularity, but the automatically generated POI rating for popularity is low, the confidence score may likewise be low. Conversely, if the third-party rating and the POI rating are very similar in value, a confidence score may be high. The rating server 1014 may also automatically generate a combined rating of a third-party rating and a POI rating. For example, a third-party cost rating may be "high" and a POI rating for cost may be "moderate." A combined cost rating for the associated point of interest 1004 may be "moderately high." Although this example depicts the ratings as categorical, a derived combined rating may also be numerical, such as an average or weighted average dollar value. It will be appreciated that many other configurations are possible.

With further reference to FIG. 1, and in some non-limiting embodiments or aspects, the rating server 1014 may provide POI ratings and/or third-party ratings and/or comparative ratings to a user of the system. Preferably, the rating data 1016 is displayed to a user via a rating display system 2000, also herein referred to as a "graphical user interface" or a "GUI." The rating server 1014 may automatically communicate one or more ratings to the user 1020, or may provide the ratings to the user 1020 in response to a user 1020 action, such as a search of a region, selection of a category of point of interest, launch/activation of a display application, and/or the like. The ratings may be provided for display in association with the points of interest 1004, such as on a visual map display depicting the region surrounding the user 1020. Preferably, and in some non-limiting embodiments or aspects, the visual map display is presented in an augmented reality or virtual reality environment as a three-dimensional augmented reality map or a virtual reality map. The user's 1020 current location may be indicated on the visual map display, and various points of interest 1004 may be shown on the map in their geographic location. The user may then select or view points of interest 1004, and POI ratings, third-party ratings, and comparative ratings may be presented in association with those points of interest 1004. Further non-limiting embodiments and aspects of displaying POI ratings are detailed in the discussion of FIGS. 3 and 4, below.

Figure 2:
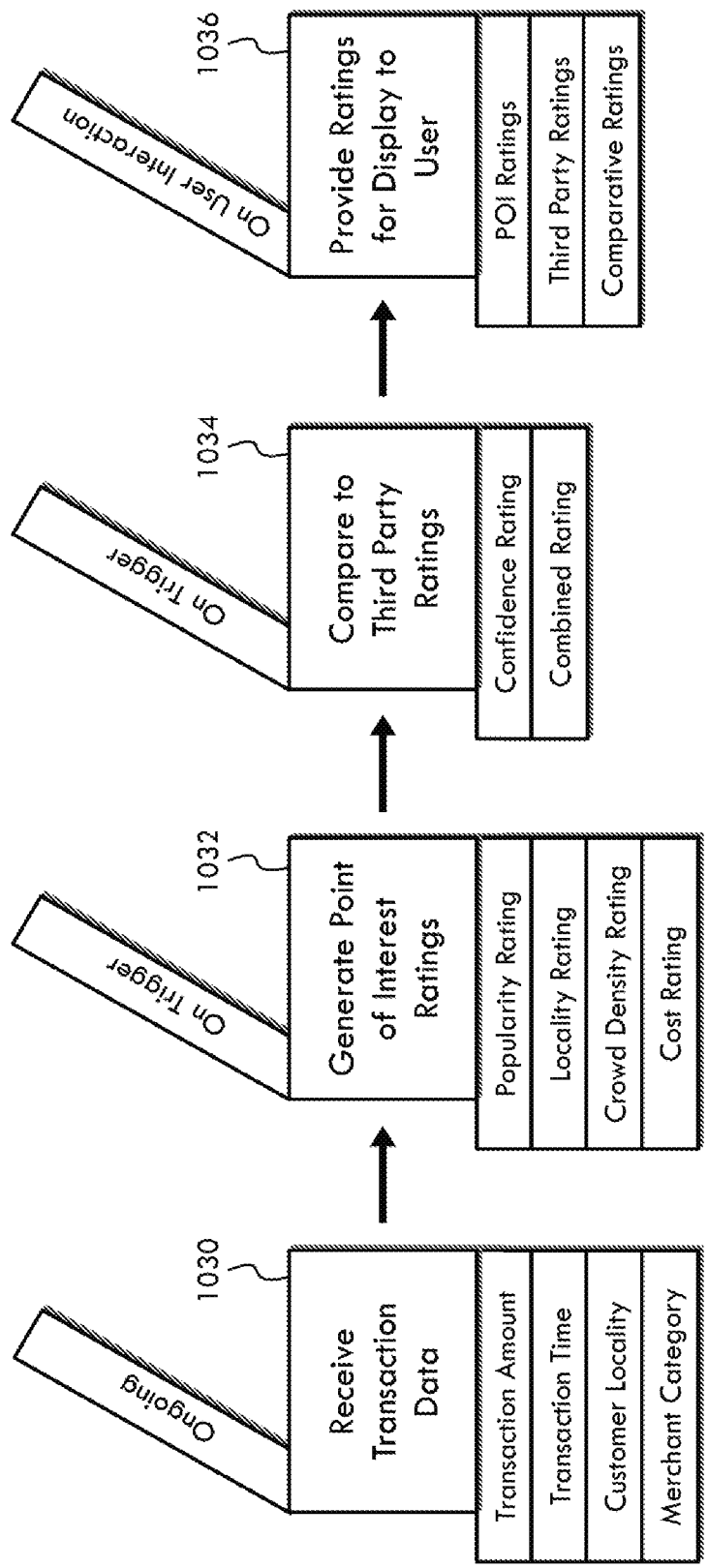
FIG. 2 is a process diagram of one embodiment or aspect of a method for generating and displaying ratings for points of interest in a region according the principles of the present disclosure.

With specific reference to FIG. 2, and in some non-limiting embodiments or aspects, provided is a method of generating and displaying ratings for points of interest in a region. The method includes receiving transaction data from one or more points of interest at step 1030. Step 1030 may be ongoing, such that transaction data may be received concurrently with the completion of financial transactions, or such that transaction data is periodically received in a continual fashion, e.g., every minute, every hour, every day, and/or the like. The transaction data received in step 1030 may include one or more of the following: transaction count, transaction amount, transaction time, customer locality (e.g., zip code, address, city, etc.), or merchant category (e.g., fuel dealers, health & beauty spas, restaurants, etc.). The method further includes generating POI ratings based at least partially on the transaction data at step 1032. Step 1032 may be conducted on a trigger or in response to an event, such as a user request, a regularly scheduled update, the receipt of new transaction data, and/or the like. The POI ratings may include a popularity rating, a locality rating, a crowd density rating, a cost rating, and/or the like. The method optionally includes comparing POI ratings to third-party ratings at step 1034. Step 1034 may be conducted on a trigger or in response to an event, such as a user request, a regularly scheduled update, the receipt of new transaction data, and/or the like. Third-party ratings may be collected and stored in a database in advance of comparison, or may be received on demand for comparison. At step 1034, comparative ratings may be generated, including a confidence rating, a combined rating, and/or the like. The method further includes providing the ratings, e.g., POI ratings, third-party ratings, and/or comparative ratings, for display to one or more users at step 1036. Step 1036 may be conducted in response to a user interaction, such as a search of region, selection of a category of point of interest, launch/activation of a display application, and/or the like. It will be appreciated that many other sequences are possible.

Figure 3:
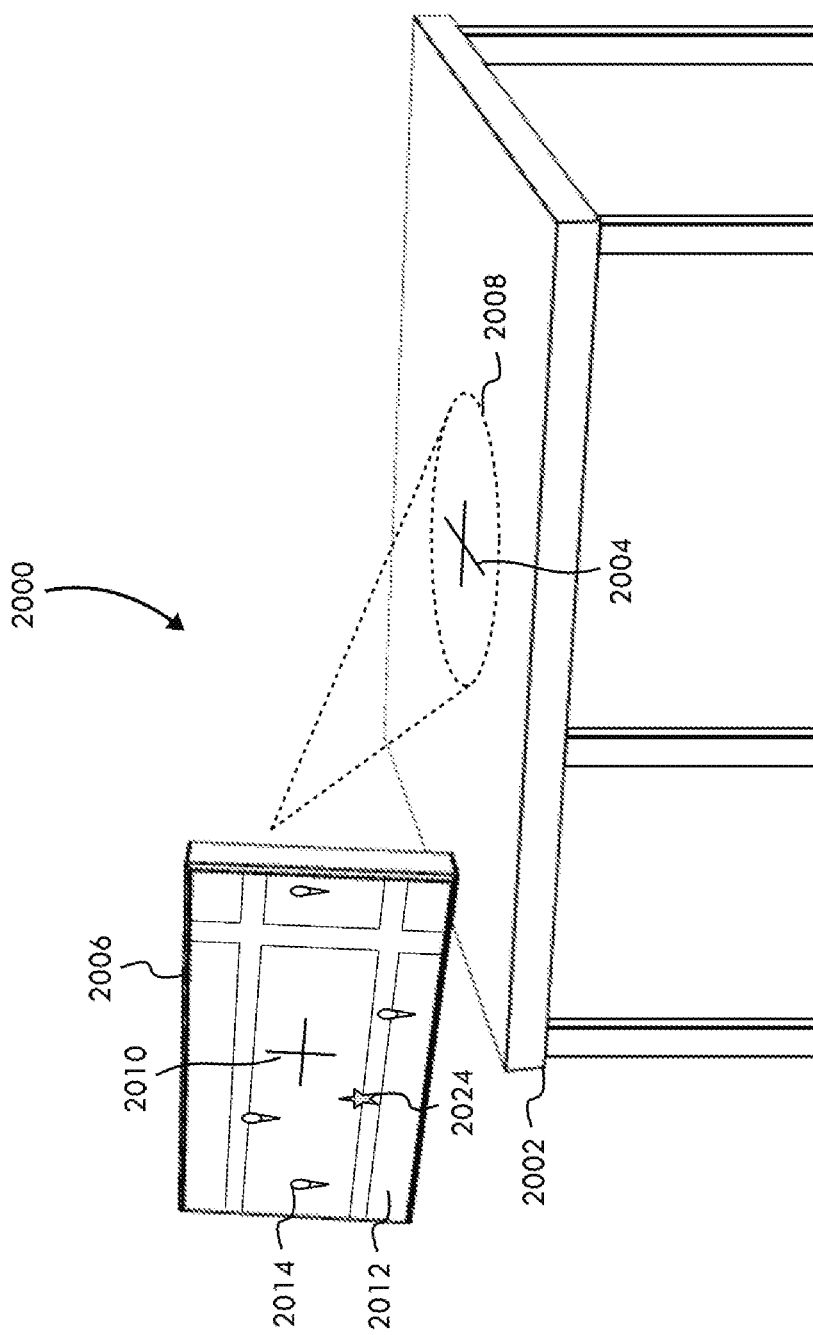
FIG. 3 is a schematic diagram of one embodiment or aspect of a system for displaying ratings for points of interest in a region according the principles of the present disclosure.

With specific reference to FIG. 3, and in some non-limiting embodiments or aspects, provided is a system 2000 for displaying ratings for points of interest in a region. The depicted embodiment is one implementation of a visual map display in an augmented reality (AR) environment, i.e., a direct or indirect view of a physical real-world environment that is supplemented by computer-generated sensory input using AR hardware (e.g., optical projection systems, computer monitors, mobile devices having one or more cameras to visualize the surrounding environment, semi-transparent films or glass, eyeglasses, augmented reality headsets/head-mounted displays, and/or the like). It will be appreciated that other variations are possible, including implementation in a virtual reality (VR) environment, i.e., generating sensory input that replicate/replace an environment using VR hardware (e.g., computer monitors, mobile devices, digital posters, projector screens, virtual reality headsets/head-mounted displays, and/or the like). In the depicted embodiment or aspect, a real-world, physical surface 2002, e.g., a table, provides an AR marker 2004, such that an AR device 2006, e.g., a mobile device, may create an AR visualization around the fixed point of the AR marker 2004. The AR device's 2006 imaging device, e.g., camera, captures visual data 2008 of the surface 2002 and the orientation and position of the marker 2004. Based on the visual data 2008, the AR device 2006 may create a visual map display 2012 augmented around a visual representation of the marker 2010 and at least a portion of the surface 2002 or surrounding space, any portion of which may be shown for reference or hidden from view. On the visual map display 2012, streets, buildings, and other objects may be depicted. POI icons 2014 may be displayed to represent the locations of points of interest in the region, and the visual map display 2012 may be updated based on movement of the AR device 2006, orientation of the AR device 2006, user input, and/or the like. The user's location also may be represented by a user icon 2024, which may be used as a comparative reference for POI locations. It will be appreciated that the points of interest may be depicted in an AR or VR environment in a non-map display, such as a list, a chart, a field, an arrangement by approximate location, and/or the like. It further will be appreciated that many other configurations are possible.

Figure 4:
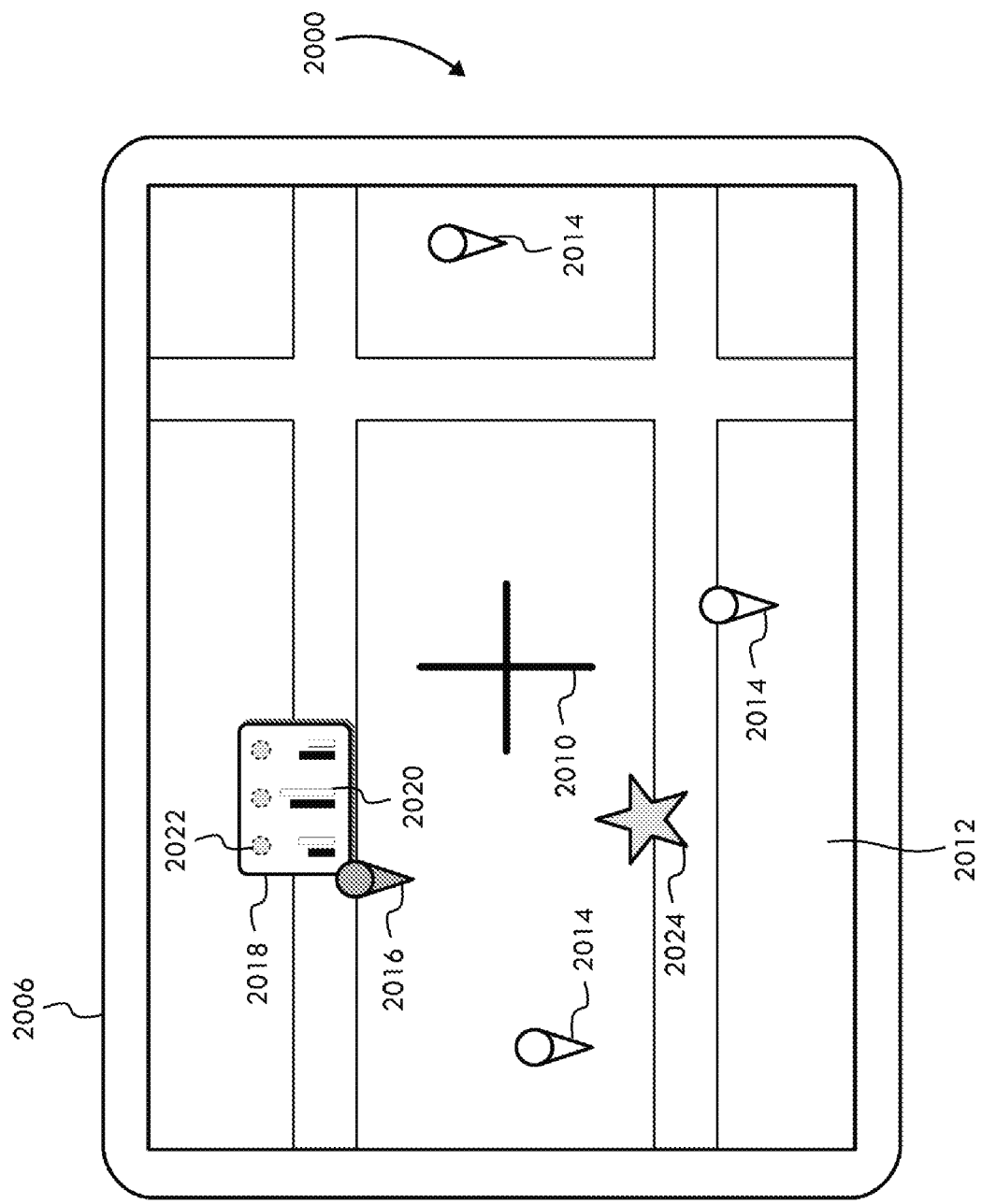
FIG. 4 is a schematic diagram of one embodiment or aspect of a system for displaying ratings for points of interest in a region according the principles of the present disclosure.

With specific reference to FIG. 4, and with continued reference to FIG. 3, provided is a schematic diagram of a system 2000 for displaying ratings for points of interest in a region. In particular, depicted is the visual map display 2012 on the AR device 2006 of FIG. 3 showing various POI icons 2014 and a user location icon 2024. The user may navigate the visual map display 2012 through physical manipulation of the AR device 2006 or by user input on the AR device 2006 interface. Depicted is a selected point of interest 2016, which the user may have selected through any number of actions, such as touching, clicking, pointing, gesturing, and/or the like. In response to the selection of a point of interest, ratings are displayed in association with the selected point of interest 2016. For example, a number of ratings are depicted in a pop-up window 2018, containing a number of graphs 2020 below a series of rating icons 2022 that indicate either the source of the rating (e.g., a third party) or the type of rating (e.g., popularity, crowd density, cost, locality). In the example of the rating icons 2022 representing various third-party sources (e.g., Google, Yelp, Trip Advisor), the graphs 2020 may be used to display third-party ratings side-by-side with comparative ratings (e.g., combined rating, confidence rating, etc.). In the example of the rating icons 2022 representing various types of ratings (e.g., popularity, crowd density, cost, locality), the graphs 2020 may be used to display third-party ratings side by side with the automatically generated POI ratings. The graphs 2020 may take another form, e.g., pie chart, categorical emblem, number, and/or the like, and the graphs 2020 need not show side-by-side comparisons, but may show third-party ratings, POI ratings, and/or comparative ratings, alone or in combination. It will be appreciated that many other configurations are possible.

With further reference to the foregoing figures, provided is an example end-to-end implementation of the present disclosure using example transaction data. For ease of illustration, example transaction data (Table 1) has been simplified to a series of transactions for a given point of interest that occurred over the course of an hour. It will be appreciated that, in practical implementation, the transaction data would include hundreds, if not thousands, of individual transactions, transaction accounts, points of interest, etc. The individual accounts are also labeled with letters for convenience, but it will be appreciated that this is for illustrative purposes only and that individual transaction accounts may be represented by any unique identifier, such as account numbers, hash values, and/or the like. For example:

TABLE 1

| Account | Amount | Account Address Distance from POI |
|---|---|---|
| A | $15.00 | 5 miles |
| B | $20.00 | 2 miles |
| C | $15.00 | 3 miles |
| D | $55.00 | 42 miles |
| E | $ 5.00 | 19 miles |
| F | $25.00 | 11 miles |
| G | $80.00 | 6 miles |
| H | $70.00 | 2 miles |
| I | $15.00 | 1 mile |
| J | $30.00 | 4 miles |
| K | $15.00 | 13 miles |
| L | $10.00 | 5 miles |

By way of illustration, the transaction data depicted in Table 1 may be received by a processor contemporaneously with the completion of the transactions or at predetermined intervals. The processor may automatically calculate one or more POI ratings for each point of interest, furthermore automatically updating the POI ratings at regular intervals and/or as ongoing transactions occur. The last column of Table 1 includes a built-in distance calculation for ease of illustration, to show the distance of the account address from the point of interest address. It will be appreciated that this distance calculation may be performed by the processor as part of a rating generation step, given data of the transaction account's locality and the point of interest's locality.

Based on a broader collection of data including all transactions across all points of interest in the region, over a longer period of time, the processor may be programmed or configured to determine a maximum transaction capacity for this hypothetical point of interest. For illustrative purposes, suppose the maximum capacity for this point of interest is 20 transactions per hour. Also suppose that the best-performing point of interest in the region, such as another merchant, completed 30 such transactions out of its capacity of 40 transactions per hour. Based on this data, the processor may automatically generate ratings for the hypothetical point of interest. For example, the processor may use example Formula B to automatically generate a popularity rating from the transaction data. This would yield a popularity score of 0.67, or 67%. The processor may keep this calculated score, or convert it to a category such as "popular," a starred rating such as "4 out of 5 stars," a graph, another metric, and/or the like. The processor may also use Formula C to automatically generate a locality rating from the transaction data. This would yield a locality score of 11.3 miles. The processor may keep this average distance, or convert it to a category such as "moderately local," a starred rating such as "3 out of 5 stars," a graph, another metric, and/or the like. The processor may also use Formula E to automatically generate a crowd density rating from the transaction data. This would yield a locality score of 0.50, or 50%. The processor may keep this calculated score, convert it to a category such as "moderately crowded," a starred rating such as "3 out of 5 stars," a graph, another metric, and/or the like. The processor may further use Formula F to automatically generate a cost rating from the transaction data. This would yield a cost score of $35.50. The processor may keep this average cost, or convert it to a category such as "moderately affordable," a starred rating such as "2 out of 5 stars," a graph, another metric, and/or the like. It will be appreciated that other formulas may be used to automatically generate the POI ratings, at that many configurations and representations of POI ratings are possible.

With further reference to the foregoing figures and the preceding illustration, it will further be appreciated that the automatically generated POI ratings may be combined with or compared to third-party ratings, or further used to produce a confidence rating. For example, suppose a Google popularity rating for the hypothetical point of interest is a 2-out-of-5 star rating, whereas the POI popularity rating is a 4-out-of-5 star rating. A combined rating might be an average, such as a 3-out-of-5 star rating, or another formula, such as a weighted average. It will be appreciated that combined ratings may be qualitative or quantitative. The POI rating may also be used to produce a confidence score of the Google rating. Given the two star difference in ratings, the confidence rating may be automatically generated as "50% confidence" or "low accuracy." Confidence ratings may also be numerical scores. Furthermore, the system may use the POI ratings, independently or in conjunction with third-party ratings, to determine one or more recommended points of interest for the user. The user's personal information, interests, preferences, or search criteria may be input by the user or stored in a user profile. Based on such user data, points of interest with desired POI ratings or third-party ratings may be recommended to the user. For example, the user may desire a point of interest with a low crowd density POI rating on Wednesday nights and the system may provide one or more points of interest matching that requirement. It will be appreciated that other configurations or calculations are possible, for ratings that are numerical, categorical, and/or the like.

With further reference to FIGS. 3 and 4 and the preceding example, an end user, desiring to search and evaluate local points of interest, may activate a visual map display 2012 on a mobile device equipped with an augmented reality or virtual reality display application, such as the AR device 2006 depicted in FIG. 3. The visual map display may depict an augmented reality geographic region of the surrounding area. Based on an augmented reality marker 2004, the user may physically or digitally manipulate the AR device 2006 to navigate through the AR map environment. Along with a map of the region, the visual map display may populate with a number of POI icons 2014 according to their location, including the hypothetical point of interest discussed above. The AR device 2006 may receive the automatically generated POI ratings along with each POI icon 2014 displayed in the region, or it may receive the POI ratings when a POI icon 2014 is specifically selected by the user. If the user selects the point of interest 2016 on the visual map display 2012, the AR device 2006 may be programmed or configured to display one or more POI ratings for the selected point of interest 2016, such as in a pop-up window 2018. For example, a locality rating may be displayed as a comparative bar graph 2020, showing the point of interest's locality as compared to the average locality rating of other points of interest in the region. The ratings may be presented to the user as starred ratings, categories, numerical scores, and/or the like. It will be appreciated that many other configurations are possible.

With further reference to the foregoing figures, the system for displaying ratings for points of interest in a region may also display promotional content, e.g., offers, coupons, prizes, etc., in a map-based or non-map-based visual display. The system may determine one or more items of promotional content to display based on the user, a transaction account associated with the user, a portable transaction device associated with the user, one or more points of interest, and/or the like. In this manner, the rating and display system may be integrated with a promotional content system to allow the user to interact with the promotional content, such as accepting displayed offers, saving coupons, selecting prizes, or other like interactions. By way of example, if the user is viewing POI ratings for a selected restaurant, the user may be presented with coupons for appetizers for the restaurant. The user may then select one or more coupons for later use at the restaurant. It will be appreciated that this example is illustrative and that many other configurations are possible within the scope of the present disclosure.

Although the disclosure has been described in detail for the purpose of illustration based on what is currently considered to be the most practical and non-limiting embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method for generating ratings for points of interest in a region, comprising:

receiving transaction data from a plurality of points of interest, via a transaction service provider, the transaction data representing financial transactions between a plurality of individuals and each point of interest of the plurality of points of interest, the transaction data received concurrently with completion of the financial transactions, and the transaction data comprising at least one of the following: transaction count, transaction amount, transaction time, locality of the plurality of individuals, or any combination thereof;

in response to receiving the transaction data, automatically generating for each point of interest of the plurality of points of interest, at least one point-of-interest (POI) rating based at least partially on the transaction data for the point of interest, the at least one POI rating comprising at least one of the following: a popularity rating based at least partially on a frequency of financial transactions at the point of interest, a locality rating based at least partially on the locality of the plurality of individuals associated with the financial transactions at the point of interest, a crowd density rating based at least partially on a correlation between a frequency and the transaction time of financial transactions at the point of interest, a cost rating based at least partially on the transaction amount associated with each financial transaction at the point of interest, or any combination thereof;

generating display data configured to generate on a display device a visual representation of at least one point of interest of the plurality of points of interest, the display data further configured to provide a visual representation of the at least one POI rating in association with the at least one point of interest;

in response to a selection of a chosen point of interest of the plurality of points of interest, providing to at least one user the at least one POI rating associated with the chosen point of interest;

in response to a new financial transaction occurring at each point of interest of the plurality of points of interest, updating in real time the at least one POI rating to produce an updated at least one POI rating for the point of interest; and regenerating the display data based on a position of the display device and the updated at least one POI rating for the chosen point of interest.

2. The computer-implemented method of claim 1, wherein the transaction data comprises at least a transaction amount, a transaction time, and a locality of the plurality of individuals.

3. The computer-implemented method of claim 1, wherein the at least one POI rating comprises the locality rating.

4. The computer-implemented method of claim 3, wherein the at least one POI rating comprises the crowd density rating.

5. The computer-implemented method of claim 4, wherein the at least one POI rating comprises the popularity rating and the cost rating.

6. The computer-implemented method of claim 4, wherein the crowd density rating is determined relative to the transaction capacity of the point of interest.

7. The computer-implemented method of claim 1, further comprising:
obtaining at least one third-party rating associated with the chosen point of interest; and
in response to the selection of the chosen point of interest of the plurality of points of interest, providing to the at least one user the at least one third-party rating along with the at least one POI rating associated with the chosen point of interest for comparison by the at least one user.

8. The computer-implemented method of claim 7, further comprising:
automatically generating a confidence score of the at least one third-party rating based at least partially on a comparison to the at least one POI rating associated with the chosen point of interest; and
in response to the selection of the chosen point of interest of the plurality of points of interest, providing the confidence score to the at least one user.

9. The computer-implemented method of claim 7, further comprising:
automatically generating at least one combined rating based at least partially on a combination of the at least one third-party rating and the at least one POI rating; and
in response to the selection of the chosen point of interest of the plurality of points of interest, providing the at least one combined rating to the at least one user.

10. The computer-implemented method of claim 1, further comprising:
automatically generating at least one recommended point of interest of the plurality of points of interest based at least partially on the at least one POI rating associated with the at least one recommended point of interest and at least one of the following data: personal information of the at least one user, a preference of the at least one user, a location of the at least one user, or any combination thereof; and
providing to the at least one user the at least one recommended point of interest.

11. A system for generating ratings for points of interest in a region, comprising:
a database comprising transaction data from a plurality of points of interest, the transaction data representing financial transactions between a plurality of individuals and each point of interest of the plurality of points of interest and comprising at least one of the following: transaction count, transaction amount, transaction time, locality of the plurality of individuals, or any combination thereof;
at least one processor in communication with the database, the at least one processor programmed or configured to:
receive the transaction data, via a transaction service provider, concurrently with completion of the financial transactions;
in response to receiving the transaction data, automatically generate, for each point of interest of the plurality of points of interest, at least one point-of-interest (POI) rating based at least partially on the transaction data for the point of interest, the at least one POI rating comprising at least one of the following: a popularity rating based at least partially on a frequency of financial transactions at the point of interest, a locality rating based at least partially on the locality of the plurality of individuals associated with the financial transactions at the point of interest, a crowd density rating based at least partially on a correlation between a frequency and the transaction time of financial transactions at the point of interest, a cost rating based at least partially on the transaction amount associated with each financial transaction at the point of interest, or any combination thereof;
generate display data configured to generate on a display device a visual representation of at least one point of interest of the plurality of points of interest, the display data further configured to provide a visual representation of the at least one POI rating in association with the at least one point of interest;
in response to a selection of a chosen point of interest of the plurality of points of interest, provide to at least one user the at least one POI rating associated with the chosen point of interest;
in response to a new financial transaction occurring at each point of interest of the plurality of points of interest, update in real time the at least one POI rating to produce an updated at least one POI rating for the point of interest; and
regenerate the display data based on a position of the display device and the updated at least one POI rating for the chosen point of interest.

12. The system of claim 11, wherein the transaction data comprises at least a transaction amount, a transaction time, and a locality of the plurality of individuals.

13. The system of claim 11, wherein the at least one POI rating comprises the locality rating.

14. The system of claim 13, wherein the at least one POI rating comprises the crowd density rating.

15. The system of claim 14, wherein the at least one POI rating comprises the popularity rating and the cost rating.

16. The system of claim 14, wherein the crowd density rating is determined relative to the transaction capacity of the point of interest.

* * * * *